US009218245B1

(12) United States Patent
MacDonald McAlister et al.

(10) Patent No.: US 9,218,245 B1
(45) Date of Patent: *Dec. 22, 2015

(54) CLONING AND RECOVERY OF DATA VOLUMES

(71) Applicant: Amazon Technologies, Inc., Reno, NV (US)

(72) Inventors: Grant Alexander MacDonald McAlister, Seattle, WA (US); Milovan Milovanovic, Alexandria, VA (US)

(73) Assignee: Amazon Technologies, Inc., Reno, NV (US)

( * ) Notice: Subject to any disclaimer, the term of this patent is extended or adjusted under 35 U.S.C. 154(b) by 230 days.

This patent is subject to a terminal disclaimer.

(21) Appl. No.: 14/063,626

(22) Filed: Oct. 25, 2013

Related U.S. Application Data

(63) Continuation of application No. 13/620,962, filed on Sep. 15, 2012, now Pat. No. 8,612,396, which is a continuation of application No. 12/415,968, filed on Mar. 31, 2009, now Pat. No. 8,332,365.

(51) Int. Cl.
*G06F 17/00* (2006.01)
*G06F 11/14* (2006.01)

(52) U.S. Cl.
CPC .................... *G06F 11/1412* (2013.01)

(58) Field of Classification Search
None
See application file for complete search history.

(56) References Cited

U.S. PATENT DOCUMENTS

| 5,555,404 A | 9/1996 | Torbjornsen et al. |
| 6,018,746 A | 1/2000 | Hill et al. |
| 6,205,465 B1 | 3/2001 | Schoening et al. |
| 6,442,707 B1 | 8/2002 | McGrath et al. |
| 6,542,907 B1 | 4/2003 | Cohen |
| 6,560,639 B1 | 5/2003 | Dan et al. |
| 6,611,867 B1 | 8/2003 | Bowman-Amuah et al. |
| 6,671,821 B1 | 12/2003 | Castro et al. |
| 6,675,299 B2 | 1/2004 | Porter et al. |

(Continued)

FOREIGN PATENT DOCUMENTS

| CN | 101099172 A | 1/2008 |
| CN | 101501688 A | 8/2009 |

(Continued)

OTHER PUBLICATIONS

Office Action mailed Apr. 14, 2014; in corresponding Canadian patent application No. 2,776,384.

(Continued)

*Primary Examiner* — Stephen Alvesteffer
*Assistant Examiner* — Hua Lu
(74) *Attorney, Agent, or Firm* — Robert C. Kowert; Meyertons, Hood, Kivlin, Kowert & Goetzel, P.C.

(57) ABSTRACT

Aspects of a data environment, such as the cloning, hibernation, and recovery of databases, are managed using a separate control environment. A monitoring component of the control environment can periodically communicate with the data environment to determine any necessary actions to be performed, such as to recover from faults or events for a data instance in the data environment. A workflow can be instantiated that includes tasks necessary to perform actions such as recovery, hibernation, resumption from hibernation, or backup or cloning. Tasks of the workflow can cause certain jobs to be performed by host managers in the data environment to affect calls made to the control environment.

22 Claims, 7 Drawing Sheets

(56) References Cited

U.S. PATENT DOCUMENTS

| | | | |
|---|---|---|---|
| 6,961,768 B2 | 11/2005 | Davis et al. | |
| 6,981,135 B1 | 12/2005 | Trask | |
| 6,985,955 B2 | 1/2006 | Gullotta et al. | |
| 6,988,139 B1 | 1/2006 | Jervis et al. | |
| 7,062,559 B2 | 6/2006 | Yoshimura et al. | |
| 7,065,624 B1 | 6/2006 | Zahavi | |
| 7,124,289 B1 | 10/2006 | Suorsa | |
| 7,133,907 B2 | 11/2006 | Carlson et al. | |
| 7,315,826 B1 | 1/2008 | Guheen et al. | |
| 7,415,484 B1 | 8/2008 | Tulkoff et al. | |
| 7,418,484 B2 | 8/2008 | Presley | |
| 7,478,263 B1 | 1/2009 | Kownacki et al. | |
| 7,502,329 B2 | 3/2009 | Li | |
| 7,506,021 B2 | 3/2009 | Polan et al. | |
| 7,536,686 B2* | 5/2009 | Tan et al. | 717/174 |
| 7,624,133 B1* | 11/2009 | Ojalvo | |
| 7,680,771 B2 | 3/2010 | Cialini et al. | |
| 7,769,721 B2 | 8/2010 | Ueoka et al. | |
| 7,801,932 B2 | 9/2010 | Krishnaswamy | |
| 7,966,528 B2 | 6/2011 | Troppmann et al. | |
| 7,991,749 B2* | 8/2011 | Nishikawa et al. | 707/682 |
| 8,020,037 B1 | 9/2011 | Schwartz et al. | |
| 8,041,679 B1* | 10/2011 | Narayanan | 707/645 |
| 8,078,587 B2 | 12/2011 | Wahlert et al. | |
| 8,121,981 B2 | 2/2012 | Simek et al. | |
| 8,150,808 B2 | 4/2012 | Zha et al. | |
| 8,150,904 B2 | 4/2012 | Queck et al. | |
| 8,156,082 B2* | 4/2012 | Srivastava et al. | 707/674 |
| 8,307,003 B1 | 11/2012 | Sheth et al. | |
| 8,352,608 B1 | 1/2013 | Keagy et al. | |
| 8,364,460 B2 | 1/2013 | Ostermeyer et al. | |
| 8,392,915 B2 | 3/2013 | Friedman et al. | |
| 8,676,753 B2 | 3/2014 | Sivasubramanian et al. | |
| 8,713,061 B1 | 4/2014 | Sheth | |
| 2002/0001984 A1 | 1/2002 | Franzen et al. | |
| 2002/0019844 A1 | 2/2002 | Kurowski et al. | |
| 2002/0147709 A1 | 10/2002 | Rajarajan et al. | |
| 2003/0005091 A1 | 1/2003 | Ullmann et al. | |
| 2003/0212775 A1 | 11/2003 | Steele et al. | |
| 2003/0212898 A1 | 11/2003 | Steele et al. | |
| 2004/0073676 A1 | 4/2004 | Honma et al. | |
| 2004/0078637 A1 | 4/2004 | Fellin et al. | |
| 2004/0148443 A1 | 7/2004 | Achiwa | |
| 2004/0163008 A1 | 8/2004 | Kim | |
| 2004/0174823 A1 | 9/2004 | Steele et al. | |
| 2004/0225659 A1 | 11/2004 | O'Brien et al. | |
| 2004/0267835 A1* | 12/2004 | Zwilling et al. | 707/202 |
| 2005/0004999 A1 | 1/2005 | Moore et al. | |
| 2005/0027845 A1 | 2/2005 | Secor et al. | |
| 2005/0038831 A1* | 2/2005 | Souder et al. | 707/201 |
| 2005/0193245 A1* | 9/2005 | Hayden et al. | 714/13 |
| 2005/0210128 A1 | 9/2005 | Cannon et al. | |
| 2005/0216788 A1* | 9/2005 | Mani-Meitav et al. | 714/6 |
| 2005/0243611 A1* | 11/2005 | Lubbers et al. | 365/189.05 |
| 2005/0262164 A1 | 11/2005 | Guiheneuf et al. | |
| 2005/0283655 A1 | 12/2005 | Ashmore | |
| 2005/0289310 A1 | 12/2005 | Miki | |
| 2006/0019535 A1 | 1/2006 | Fukushima et al. | |
| 2006/0041641 A1 | 2/2006 | Breiter et al. | |
| 2006/0053251 A1 | 3/2006 | Nicholson et al. | |
| 2006/0104231 A1 | 5/2006 | Gidwani | |
| 2006/0106675 A1 | 5/2006 | Bezos et al. | |
| 2006/0106774 A1 | 5/2006 | Cohen et al. | |
| 2007/0022122 A1* | 1/2007 | Bahar et al. | 707/10 |
| 2007/0061266 A1 | 3/2007 | Moore et al. | |
| 2007/0061487 A1 | 3/2007 | Moore et al. | |
| 2007/0083588 A1 | 4/2007 | Keller et al. | |
| 2007/0156842 A1 | 7/2007 | Vermeulen et al. | |
| 2007/0156872 A1 | 7/2007 | Stoyanova | |
| 2007/0162420 A1 | 7/2007 | Ou et al. | |
| 2007/0174691 A1* | 7/2007 | D'Souza et al. | 714/13 |
| 2007/0192329 A1 | 8/2007 | Croft et al. | |
| 2007/0234028 A1 | 10/2007 | Rothman et al. | |
| 2007/0234115 A1 | 10/2007 | Saika | |
| 2007/0244996 A1 | 10/2007 | Ahmed et al. | |
| 2007/0260693 A1 | 11/2007 | Cardone et al. | |
| 2007/0260696 A1* | 11/2007 | Bohannon et al. | 709/208 |
| 2007/0260912 A1 | 11/2007 | Hatasaki et al. | |
| 2007/0271275 A1 | 11/2007 | Fassette et al. | |
| 2007/0283443 A1 | 12/2007 | McPherson et al. | |
| 2007/0288526 A1* | 12/2007 | Mankad et al. | 707/200 |
| 2007/0299828 A1 | 12/2007 | Lewis et al. | |
| 2008/0016293 A1 | 1/2008 | Saika | |
| 2008/0040509 A1 | 2/2008 | Werb et al. | |
| 2008/0065650 A1* | 3/2008 | Kim et al. | 707/10 |
| 2008/0109448 A1 | 5/2008 | Aboel-Nil et al. | |
| 2008/0126734 A1 | 5/2008 | Murase | |
| 2008/0134176 A1 | 6/2008 | Fitzgerald et al. | |
| 2008/0134178 A1 | 6/2008 | Fitzgerald et al. | |
| 2008/0162590 A1* | 7/2008 | Kundu et al. | 707/202 |
| 2008/0183991 A1 | 7/2008 | Cosmadopoulos et al. | |
| 2008/0189413 A1 | 8/2008 | Srivastava et al. | |
| 2008/0189769 A1 | 8/2008 | Casado et al. | |
| 2008/0195622 A1 | 8/2008 | Lelcuk et al. | |
| 2008/0244579 A1 | 10/2008 | Muller | |
| 2008/0256384 A1 | 10/2008 | Branson et al. | |
| 2008/0263388 A1 | 10/2008 | Allen et al. | |
| 2008/0301663 A1 | 12/2008 | Bahat et al. | |
| 2009/0006888 A1 | 1/2009 | Bernhard et al. | |
| 2009/0019137 A1 | 1/2009 | Mishra et al. | |
| 2009/0019535 A1 | 1/2009 | Mishra et al. | |
| 2009/0037425 A1 | 2/2009 | Erickson et al. | |
| 2009/0063509 A1 | 3/2009 | Lockhart et al. | |
| 2009/0063563 A1 | 3/2009 | Khangaonkar et al. | |
| 2009/0106411 A1 | 4/2009 | Lisiecki et al. | |
| 2009/0106441 A1 | 4/2009 | Zuckerman et al. | |
| 2009/0138577 A1 | 5/2009 | Casado | |
| 2009/0164853 A1* | 6/2009 | Gokhale et al. | 714/57 |
| 2009/0198940 A1 | 8/2009 | Ash et al. | |
| 2009/0216881 A1 | 8/2009 | Lovy et al. | |
| 2009/0271656 A1 | 10/2009 | Yokota et al. | |
| 2009/0300093 A1 | 12/2009 | Griffiths et al. | |
| 2009/0328065 A1 | 12/2009 | Wookey | |
| 2010/0005531 A1 | 1/2010 | Largman et al. | |
| 2010/0036851 A1 | 2/2010 | Paterson-Jones et al. | |
| 2010/0077160 A1 | 3/2010 | Liu et al. | |
| 2010/0125555 A1 | 5/2010 | Lau et al. | |
| 2010/0169707 A1 | 7/2010 | Mathew et al. | |
| 2010/0191713 A1* | 7/2010 | Lomet et al. | 707/704 |
| 2010/0198972 A1 | 8/2010 | Umbehocker | |
| 2010/0211548 A1 | 8/2010 | Ott et al. | |
| 2010/0250499 A1 | 9/2010 | McAlister et al. | |
| 2010/0250748 A1 | 9/2010 | Sivasubramanian et al. | |
| 2010/0251002 A1 | 9/2010 | Sivasubramanian et al. | |
| 2010/0251242 A1 | 9/2010 | Sivasubramanian | |
| 2010/0251339 A1 | 9/2010 | McAlister | |
| 2010/0262650 A1 | 10/2010 | Chauhan et al. | |
| 2011/0004457 A1 | 1/2011 | Haviv et al. | |
| 2011/0004916 A1 | 1/2011 | Schiffman et al. | |
| 2011/0083138 A1 | 4/2011 | Sivasubramanian et al. | |
| 2011/0099146 A1 | 4/2011 | Mcalister et al. | |
| 2011/0099147 A1 | 4/2011 | McAlister et al. | |
| 2011/0099420 A1 | 4/2011 | Sivasubramanian et al. | |
| 2011/0178793 A1 | 7/2011 | Giffin et al. | |
| 2011/0288847 A1 | 11/2011 | Narayanan et al. | |
| 2013/0066834 A1 | 3/2013 | Mcalister et al. | |
| 2013/0066923 A1 | 3/2013 | Sivasubramanian | |
| 2014/0081916 A1 | 3/2014 | Mcalister | |
| 2014/0201363 A1 | 7/2014 | Mcalister | |
| 2014/0229698 A1 | 8/2014 | Sivasubramanian | |

FOREIGN PATENT DOCUMENTS

| | | | |
|---|---|---|---|
| CN | 101512507 A | 8/2009 | |
| CN | 101539841 A | 9/2009 | |
| JP | 10-312327 A | 11/1998 | |
| JP | 2000-172721 A | 6/2000 | |
| JP | 2003330781 | 11/2003 | |
| JP | 2004-206694 A | 7/2004 | |
| JP | 2004-362596 A | 12/2004 | |
| JP | 2005-267056 A | 9/2005 | |
| JP | 2006-011874 A | 1/2006 | |
| JP | 2006048676 | 2/2006 | |
| JP | 2006065845 | 3/2006 | |

(56) References Cited

FOREIGN PATENT DOCUMENTS

| | | |
|---|---|---|
| JP | 2007-516510 A | 6/2007 |
| JP | 2008009809 | 1/2008 |
| JP | 2008-141339 A | 6/2008 |
| JP | 2009522659 | 6/2009 |
| JP | 2009-230742 A | 10/2009 |
| WO | 2009012296 | 1/2009 |
| WO | 2009036079 | 3/2009 |

OTHER PUBLICATIONS

Office Action mailed Apr. 3, 2014; in corresponding Canadian patent application No. 2,778,110.
Office Action mailed Aug. 22, 2014; in corresponding Canadian patent application No. 2,755,913.
Office Action mailed Apr. 1, 2014; in corresponding Chinese patent application No. 201080053676.7.
Office Action mailed Apr. 21, 2014; in corresponding Chinese patent application No. 201080056327.0.
Office Action mailed May 5, 2014; in corresponding Chinese patent application No. 201080056311.X.
English translation of the Office Action mailed Jul. 7, 2014; in corresponding Chinese patent application No. 201080015811.9.
Office Action mailed Jul. 7, 2014; in corresponding Chinese patent application No. 201080015811.9.
Communication Pursuant to Rules 70(2) and 70a(2) EPC mailed Aug. 20, 2014; in corresponding European patent application No. 10759357.6.
Non-Final Office Action mailed Apr. 9, 2014; in corresponding U.S. Appl. No. 12/416,017.
Non-Final Office Action mailed Jul. 30, 2014; in corresponding U.S. Appl. No. 12/575,381.
Non-Final Office Action mailed May 7, 2014; in corresponding U.S. Appl. No. 13/621,044.
Final Office Action mailed Jul. 22, 2014; in corresponding U.S. Appl. No. 12/415,998.
Candan, K. Selcuk; Frontiers in Information and Software as Services ; 2009 IEEE international Conference on Data Engineering.
Unix/Linux Administration Logical Volume Management Guide (2005); Pollock; 14 pages.
IBM Redbook: SAN Volume Controller: Best Practices and Performance Guidelines (draft); Tate et al. (Jul. 2007); 330 pages.
z/VM and Linux on IBM System z—The Virtualization Cookbook for Red Hat Enterprise Linux 5.2; MacIsaac et al. (Oct. 2008); 268 pages.
Examination Report mailed Oct. 31, 2012; in corresponding Singaporean patent application No. 201202502-9.
Examination Report mailed Sep. 21, 2012; in corresponding Singaporean patent application No. 201202870-0.
Supplemental Notice of Allowance and Fee(s) Due mailed Oct. 25, 2013, in corresponding U.S. Appl. No. 13/294,099.
Notice of Allowance and Fee(s ) Due mailed Sep. 2, 2014; in corresponding Japanese patent application No. 2012-503674.
English translation of the Notice of Allowance and Fee(s ) Due mailed Sep. 2, 2014; in corresponding Japanese patent application No. 2012-503674.
Office Action mailed Jun. 12, 2014; in corresponding Chinese Application No. 201080049395.4.
English translation of the Office Action mailed Apr. 21, 2014; in corresponding Chinese patent application No. 201080056327.0.
English translation of the Office Action mailed Jun. 12, 2014; in corresponding Chinese Application No. 201080049395.4.
Office Action mailed Jul. 25, 2014; in corresponding Canadian patent application No. 2,778,723.
Notice of Allowance and Fee(s) Due mailed Mar. 18, 2014; in corresponding Japanese patent application No. 2012-536965.
English translation of the Notice of Allowance and Fee(s) Due mailed Mar. 18, 2014; in corresponding Japanese patent application No. 2012-536965.
English translation of the Office Action mailed Apr. 1, 2014; in corresponding Chinese patent application No. 201080053676.7.
Amazon HQ Wiki, , "RDSMySQLConfigManagement/ConfigWorkflowDesign", RDS/EDS/DesignDocs/RDSMySQLConfigManagement/ConfigWorkflowDesign from https://w.amazon.com/index.php/RDS/EDS/DesignDocs/RDSMySQLConfigManagement/ConfigWorkflowDesign; downloaded Aug. 11, 2009.
Amazon HQ Wiki "RDSMySQLConfigManagement/ConfigExecSummary", RDS/EDS/DesignDocs/RDSMySQLConfigManagement/ConfigExecSummary from https://w.amazon.com/index.php/RDS/EDS/ConfigExecSummary; downloaded Aug. 11, 2009.
English translation of the First Office Action mailed Jun. 26, 2014; in corresponding Chinese patent application No. 201080056327.0.
The First Office Action mailed Jun. 26, 2014; in corresponding Chinese patent application No. 201080056327.0.
Notice of Rejection mailed Sep. 10, 2013; in corresponding Japanese patent application No. 2012-536965.
English translation for the Notice of Rejection mailed Sep. 10, 2013; in corresponding Japanese patent application No. 2012-536965.
Examination Report mailed Sep. 6, 2013; in Canadian patent application No. 2,778,456.
Office Action mailed Sep. 16, 2014; in Japanese patent application No. 2013-262835.
English translation of the Office Action mailed Sep. 16, 2014; in Japanese patent application No. 2013-262835.
English abstract for CN101512507; published on Aug. 19, 2009 and retrieved on Nov. 4, 2014.
English abstract for CN101539841; published on Sep. 23, 2009 and retrieved on Nov. 4, 2014.
English abstract for JP2003330781; published on Nov. 21, 2003 and retrieved on Nov. 4, 2014.
English abstract for JP2008009809; published on Jan. 17, 2008 and retrieved on Nov. 4, 2014.
English abstract for JP2006065845; published on Mar. 9, 2006 and retrieved on Nov. 4, 2014.
English abstract for JP2009522659; published on Jun. 11, 2009 and retrieved on Nov. 4, 2014.
English abstract for JP2006048676; published on Feb. 16, 2006 and retrieved on Nov. 4, 2014.
English abstract for CN101501688; published on Aug. 5, 2009 and retrieved on Nov. 4, 2014.
Certificate of Grant dated May 21, 2014; in corresponding Singaporean patent application No. 2011070406.
Certificate of Grant dated Jul. 7, 2014; in corresponding Singaporean patent application No. 2012028700.
Certificate of Grant dated Apr. 25, 2014; in corresponding Japanese patent application No. 2012536965.
NPL_51_Usher: An Extensible Framework for Managing Clusters of Virtual Machines; pp. 167-181 of the Proceedings of the 21st Large Installation System Administration Conference (LISA '07) Nov. 11-16, 2007.
"Cases for E-Business Application Using Web Services Technology and Research and Study of Problems", 1st Edition, Mar. 31, 2004, pp. 1-5.
"Examination Report dated Oct. 19, 2012", Singapore Application 201202870-0, Oct. 19, 2012, 8 pages.
"Examination Report dated Oct. 29, 2012", Singapore Application 201202868-4, Oct. 29, 2012, 5 pages.
"Examination Report dated Oct. 30, 2012", Singapore Application 201107040-6, Oct. 30, 2012, 5 pages.
"Examination Report dated Oct. 9, 2012", Singapore Application 201107040-6, Oct. 9, 2012, 5 pages.
"Examination Report dated Dec. 11, 2012", Singapore Application 201202502-9, Dec. 11, 2012, 8 pages.
"Examination Report dated May 17, 2013", Singapore Application 201202967-4, May 17, 2013, 10 pages.
"Examination Report dated Sep. 13, 2013", Singapore Application 201202868-4, Sep. 13, 2013, 5 pages.
"Extended European Search Report dated Sep. 19, 2013", Europe Application 10827392.1, 6 pages.
"Final Office Action dated Oct. 14, 2011", U.S. Appl. No. 12/415,958, Oct. 14, 2011, 34 pages.

(56) References Cited

OTHER PUBLICATIONS

"Final Office Action dated Oct. 16, 2012", U.S. Appl. No. 12/575,381, Oct. 16, 2012, 42 pages.
"Final Office Action dated Oct. 19, 2011", U.S. Appl. No. 12/418,475, Oct. 19, 2011, 26 pages.
"Final Office Action dated Nov. 1, 2012", U.S. Appl. No. 12/606,106, Nov. 1, 2012, 29 pages.
"Final Office Action dated Dec. 19, 2011", U.S. Appl. No. 12/415,968, Dec. 19, 2011.
"Final Office Action dated Feb. 22, 2013", U.S. Appl. No. 13/294,099, Feb. 22, 2013.
"Final Office Action dated Mar. 22, 2011", U.S. Appl. No. 12/415,998, Mar. 22, 2011.
"Final Office Action dated May 8, 2013", U.S. Appl. No. 12/416,017, May 8, 2013.
"Non Final Office Action dated Jan. 2, 2013", U.S. Appl. No. 13/620,962, Jan. 2, 2013.
"Non Final Office Action dated Jan. 31, 2014", U.S. Appl. No. 12/415,998, 20 pages.
"Non Final Office Action dated Oct. 14, 2010", U.S. Appl. No. 12/415,998, Oct. 14, 2010.
"Non Final Office Action dated Dec. 14, 2010", U.S. Appl. No. 12/415,987, Dec. 14, 2010.
"Non Final Office Action dated Feb. 14, 2011", U.S. Appl. No. 12/606,097, Feb. 14, 2011.
"Non Final Office Action dated Mar. 14, 2012", U.S. Appl. No. 12/606,093, Mar. 14, 2012, 24 pages.
"Non Final Office Action dated Mar. 14, 2013", U.S. Appl. No. 12/606,093, Mar. 14, 2013, 24 pages.
"Non Final Office Action dated Mar. 18, 2013", U.S. Appl. No. 13/299,601, Mar. 18, 2013.
"Non Final Office Action dated Apr. 18, 2012", U.S. Appl. No. 12/575,381, Apr. 18, 2012, 31 pages.
"Non Final Office Action dated Apr. 29, 2011", U.S. Appl. No. 12/415,968, Apr. 29, 2011, 30 pages.
"Non Final Office Action dated May 2, 2011", U.S. Appl. No. 12/418,475, May 2, 2011, 20 pages.
"Non Final Office Action dated May 2, 2011", U.S. Appl. No. 12/415,958, May 2, 2011, 23 pages.
"Non Final Office Action dated May 28, 2013", U.S. Appl. No. 12/606,106, May 28, 2013.
"Non Final Office Action dated May 31, 2012", U.S. Appl. No. 12/606,106, May 31, 2012, 29 pages.
"Non Final Office Action dated Jun. 20, 2013", U.S. Appl. No. 13/621,073.
"Non Final Office Action dated Jun. 20, 2013", U.S. Appl. No. 13/620,999, Jun. 20, 2013.
"Non Final Office Action dated Jul. 23, 2013", Japan Application 2012-536964, Jul. 23, 2013.
"Non Final Office Action dated Jul. 23, 2013", Japan Application 2012-536966, Jul. 23, 2013.
"Non Final Office Action dated Aug. 19, 2011", U.S. Appl. No. 12/416,017, Aug. 19, 2011.
"Non Final Office Action dated Sep. 13, 2012", U.S. Appl. No. 13/294,099, Sep. 13, 2012.
"Non Final Office Action dated Sep. 14, 2012", U.S. Appl. No. 13/299,601, Sep. 14, 2012, 15 pages.
"Notice of Allowance dated Oct. 24, 2012", U.S. Appl. No. 12/606,093, Oct. 24, 2012, 13 pages.
"Notice of Allowance dated Nov. 13, 2012", U.S. Appl. No. 12/415,968, Nov. 13, 2012.
"Notice of Allowance dated Nov. 13, 2013", U.S. Appl. No. 12/606,106.
"Notice of Allowance dated Nov. 19, 2013", Japan Application 2012-536964.
"Notice of Allowance dated Nov. 19, 2013", Japan Application 2012-536966.
"Notice of Allowance dated Nov. 20, 2013", U.S. Appl. No. 12/606,106.
"Notice of Allowance dated Dec. 26, 2013", U.S. Appl. No. 12/415,958.
"Notice of Allowance dated Dec. 30, 2013", U.S. Appl. No. 13/620,999.
"Notice of Allowance dated Dec. 30, 2013", U.S. Appl. No. 13/621,073.
"Notice of Allowance dated Mar. 16, 2012", U.S. Appl. No. 12/418,475, Mar. 16, 2012, 11 pages.
"Notice of Allowance dated Mar. 9, 2012", U.S. Appl. No. 12/415,958, Mar. 9, 2012, 29 pages.
"Notice of Allowance dated Apr. 15, 2011", U.S. Appl. No. 12/415,987, Apr. 15, 2011.
"Notice of Allowance dated Apr. 18, 2013", U.S. Appl. No. 13/620,962, Apr. 18, 2013.
"Notice of Allowance dated Jun. 1, 2012", U.S. Appl. No. 12/415,968, Jun. 1, 2012.
"Notice of Allowance dated Jun. 26, 2012", U.S. Appl. No. 12/606,093, Jun. 26, 2012, 8 pages.
"Notice of Allowance dated Jun. 28, 2012", U.S. Appl. No. 12/418,475, Jun. 28, 2012, 20 pages.
"Notice of Allowance dated Jul. 12, 2011", U.S. Appl. No. 12/606,097, Jul. 12, 2011.
"Notice of Allowance dated Jul. 5, 2012", U.S. Appl. No. 12/415,958, Jul. 5, 2012, 14 pages.
"Notice of Allowance dated Jul. 9, 2013", Japan Application 2012-533307, Jul. 9, 2013.
"Notice of Allowance dated Aug. 12, 2013", U.S. Appl. No. 13/299,601, Aug. 12, 2013.
"Notice of Allowance dated Aug. 26, 2013", U.S. Appl. No. 13/620,962, Aug. 26, 2013.
"Notice of Allowance dated Aug. 8, 2011", U.S. Appl. No. 12/415,987, Aug. 8, 2011.
"Office Action dated Oct. 21, 2013", China Application 201080015811.9.
"Office Action dated Oct. 3, 2013", Canada Application 2,755,913.
"Office Action dated Dec. 3, 2013", Japan Application 2012-503674.
"PCT International Search Report dated Dec. 2, 2010", PCT Application No. PCT/US2010/051757, Dec. 2, 2010, 2 pages.
"PCT International Search Report dated Dec. 21, 2010", PCT Application No. PCT/US2010/054139, Dec. 21, 2010, 2 pages.
"PCT International Search Report dated Dec. 21, 2010", PCT Application No. PCT/US2010/054141, Dec. 21, 2010, 2 pages.
"PCT International Search Report dated Dec. 23, 2010", PCT Application No. PCT/US2010/054133, Dec. 23, 2010, 2 pages.
"PCT International Search Report dated May 25, 2010", PCT Application No. PCT/US2010/029476, May 25, 2010, 2 pages.
"PCT International Written Opinion dated Dec. 23, 2010", PCT Application No. PCT/US2010/054133, Dec. 23, 2010, 6 pages.
"Supplemental Notice of Allowance dated Oct. 25, 2013", U.S. Appl. No. 13/294,099.
"Written Opinion dated Oct. 2, 2012", Singapore Application 201202967-4, Oct. 2, 2012, 14 pages.
"Written Opinion dated Feb. 15, 2012", Singapore Application 201107040-6, Feb. 15, 2012, 6 pages.
Battles, Brett et al., "Reducing Data Center Power Consumption Through Efficient Storage", Google Scholar, <http://www.it-executive.nl/images/downloads/reducing-datacenter-power.pdf>, 2007, 9 pages.
Cordy, James R. , "Practical Language—Independent Detection of Near-Miss Clones", ACM, <http://delivery.acm.org/10.1145/1040000/1034915/p1-cordy.pdf>, 2001, 12 pages.
Ghemawat, Sanjay et al., "The Google File System", SOSP'03, Bolton Landing, New York., Oct. 19, 2003, 15 pages.
Lahiri, Tirthankar et al., "Cache Fusion: Extending Shared—Disk Clusters with Shared Caches", 27th VLDB Conference; Roma, Italy., 2001, 4 pages.
Lomet, David et al., "Recovery from "Bad" User Transactions", ACM, <http://delivery.acm.org/10.1145/1150000/1142512/p337-lomet.pdf>, 2006, 10 pages.
Lorentz, Diana et al., "Oracle 9i SQL", Release 2 (9.2), Oracle Corporation., 2002, 5 pages.
Mietzner, Ralph et al., "Towards Provisioning the Cloud: On the Usage of Multi-Granularity Flows and Services to Realize a Unified

(56) References Cited

OTHER PUBLICATIONS

Provisioning Infrastructure for SaaS Applications", 2008 IEEE Congress on Services, Part 1, 2008, 3-10.
Suzuki, Yasuhiro et al., "Cloud Computing, Provision", No. 58, Jul. 31, 2008, pp. 35-41.
Wang, Yi et al., "Virtual Routers on the Move: Live Router Migration as a Network-Management Primitive", ACM, <http://delivery.acm.org/10.1145/1410000/1402985/p231-wang.pdf>, 2008, 12 pages.
Non-Final Office Action dated Apr. 29, 2011, U.S. Appl. No. 12/415,968, 30 pages.
Non-Final Office Action dated May 2, 2011, U.S. Appl. No. 12/415,968, 27 pages.
Response to Apr. 29, 2011 Non-Final Office Action filed Jul. 26, 2011, U.S. Appl. No. 12/415,968.
Final Office Action dated Oct. 14, 2011, U.S. Appl. No. 12/415,968, 23 pages.
Final Office Action dated Dec. 19, 2011, U.S. Appl. No. 12/415,968, 28 pages.
Notice of Allowance dated Mar. 9, 2012, U.S. Appl. No. 12/415,968, 15 pages.
Non-Final Office Action dated Mar. 14, 2012, U.S. Appl. No. 12/606,093, 24 pages.
RCE and Response to Dec. 19, 2011 Final Office Action filed Mar. 14, 2012, U.S. Appl. No. 12/415,968.
Non-Final Office Action dated Apr. 18, 2012, U.S. Appl. No. 12/575,381, 31 pages.
Non-Final Office Action dated May 31, 2012, U.S. Appl. No. 12/606,106, 28 pages.
Notice of Allowance dated Jun. 1, 2012, U.S. Appl. No. 12/415,968, 14 pages.
RCE filed Jun. 20, 2012, U.S. Appl. No. 13/620,962, 2 pages.
Notice of Allowance dated Jun. 26, 2012, U.S. Appl. No. 12/606,093, 8 pages.
Notice of Allowance dated Jul. 5, 2012, U.S. Appl. No. 12/415,958, 25 pages.
Amendment After Allowance dated Aug. 29, 2012, U.S. Appl. No. 12/415,958.
Amendment After Allowance dated Aug. 29, 2012, Marked Ok to Enter: /H.L./, U.S. Appl. No. 12/415,958.
Final Office Action dated Oct. 16, 2012, U.S. Appl. No. 12/575,381, 41 pages.
Notice of Allowance dated Oct. 24, 2012, U.S. Appl. No. 12/606,093, 13 pages.
Final Office Action dated Nov. 1, 2012, U.S. Appl. No. 12/606,106, 29 pages.
Corrected Notice of Allowability Nov. 13, 2012, U.S. Appl. No. 12/415,958, 6 pages.
Issue Notification, U.S. Appl. No. 12/415,958, 1 page, Apr. 9, 2014.
Non-Final Office Action dated Jan. 2, 2013, U.S. Appl. No. 13/620,962, 41 pages.
Response to Jan. 2, 2013 Non-Final Office Action filed Mar. 22, 2013, U.S. Appl. No. 13/620,962.
Terminal Disclaimer filed Apr. 1, 2013, U.S. Appl. No. 13/620,962.
Terminal Disclaimer Approved, dated Apr. 1, 2013, U.S. Appl. No. 13/620,962.
Notice of Allowance dated Apr. 18, 2013, U.S. Appl. No. 13/620,962, 10 pages.
Notice of Allowance dated Aug. 26, 2013, U.S. Appl. No. 13/620,962, 10 pages.
PCT International Search Report and Written Opinion dated Dec. 23, 2010, PCT Application No. PCT/US2010/054133, 7 pages.
PCT International Search Report and Written Opinion dated Dec. 2, 2010, PCT Application No. PCT/US2010/051757, 7 pages.
PCT International Search Report and Written Opinion dated Dec. 21, 2010, PCT Application No. PCT/US2010/054139, 7 pages.
PCT International Search Report and Written Opinion dated Dec. 21, 2010, PCT Application No. PCT/US2010/054141, 7 pages.
PCT International Search Report and Written Opinion dated May 25, 2010, PCT Application No. PCT/US2010/029476, 7 pages.
Singapore Exam Report dated Oct. 30, 2012, Singapore Application No. 201107040-6, 5 pages.
Singapore Exam Report dated Feb. 15, 2012, Singapore Application No. 201107040-6, 6 pages.
Cordy, James R., "Practical Language—Independent Detection of Near-Miss Clones", ACM, <http://fdelivery.acm.org/10.1145/1040000/1034915/p1-cordy.pdf>, 2001, 12 pages.
Ghemawat, Sanjay et al., "The Google File System", SOSP'03, Bolton Landing, New York, Oct. 19-22, 2003, 15 pages.
Lahri, Tirthankar et al., "Cache Fusion: Extending Shared—Disk Clusters with Shared Caches", 27th VLDB Conference; Roma, Italy, 2001, 4 pages.
Lomet, David et al., "Recovery from "Bad" User Transactions", ACM, <http://delivery.acm.org/10.1145/1150000/114512/p337-lomet.pdf>, 2006, 10 pages.
Lorentz, Diana et al., "Oracle 9i SQL Reference", Release 2 (9.2), Oracle Corporation, Oct. 2002, 1-1 to 1-3.
Wang, Yi et al., "Virtual Routers on the Move: Live Router Migratin as a Network—Management Primitive", ACM, <http://delivery.acm.org/10.1145/1410000/1402985/p231-wang.pdf>, 2008, 12 pages.

\* cited by examiner

CLONING AND RECOVERY OF DATA VOLUMES

CROSS-REFERENCE TO RELATED APPLICATIONS

This application is a continuation of allowed U.S. patent application Ser. No. 13/620,962, filed Sep. 15, 2012, which is a continuation of U.S. patent application Ser. No. 12/415,968, filed Mar. 31, 2009 and issued as U.S. Pat. No. 8,332,365 on Dec. 11, 2012,

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

A customer can occasionally wish to create a copy of a data store for purposes such as testing or development. Using conventional approaches, the source data store must be taken offline and the data exported out of the data store to create a new copy. Such an approach is inefficient, requires manual intervention, and results in the unavailability of the source data store for a period of time.

Further, a data store or data instance might experience an error of a type that requires a complete recovery action. In conventional systems, this typically requires a database administrator (DBA) or similar operator to physically visit the location of the machines hosting the data store, locate the physical backups (often on tape), and execute and monitor the recovery process. Such an approach is inefficient at best, and can result in substantial downtime of the data store. Further, such an approach is limited to the data on the backup tapes, which often are archived once a day at most.

BRIEF DESCRIPTION OF THE DRAWINGS

Various embodiments in accordance with the present disclosure will be described with reference to the drawings, in which.

DETAILED DESCRIPTION

Figure 1:
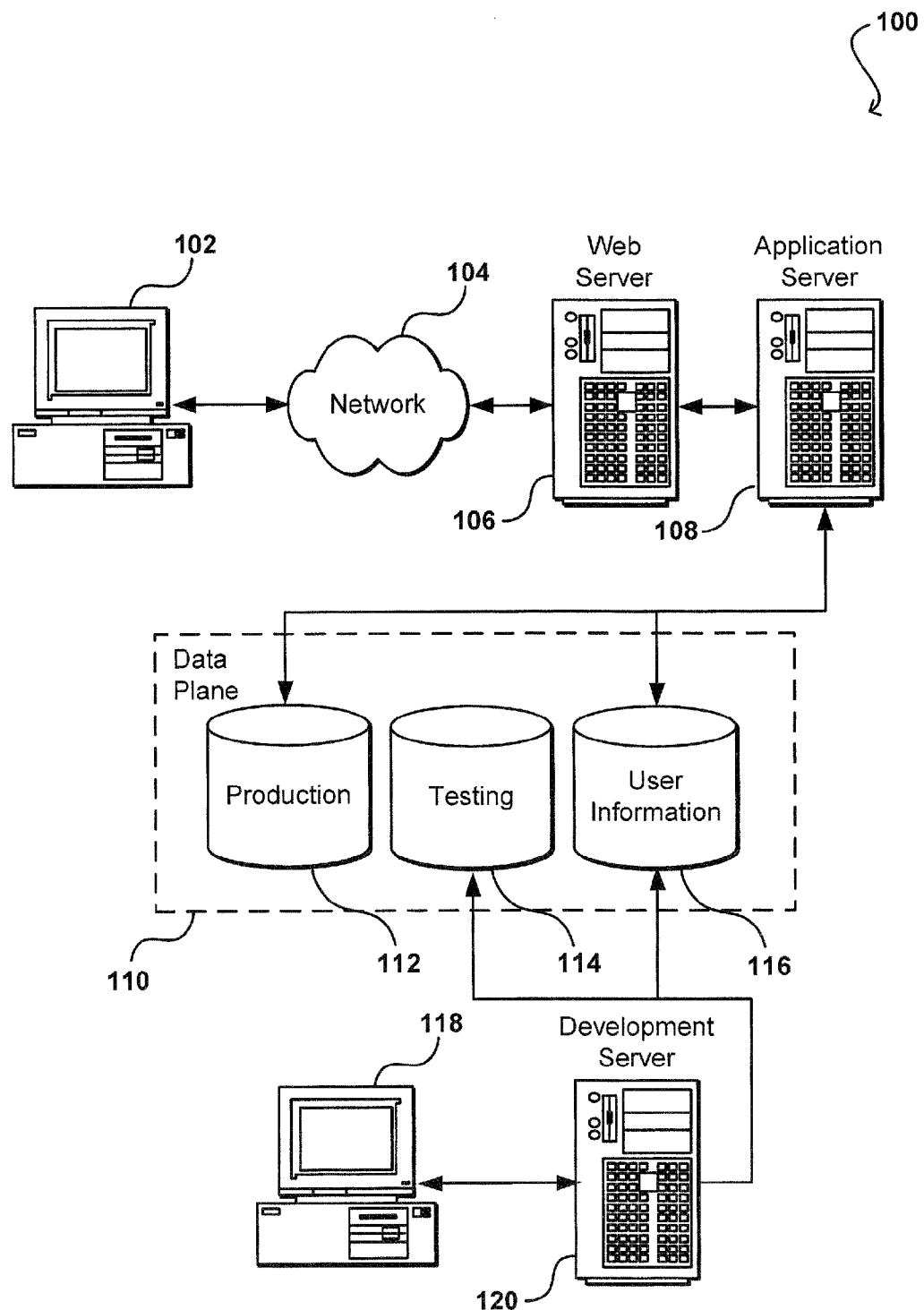
FIG. 1 illustrates an environment in which various embodiments can be implemented.

Systems and methods in accordance with various embodiments of the present disclosure may overcome one or more of the aforementioned and other deficiencies experienced in conventional approaches to managing aspects of data storage in an electronic environment. In particular, various embodiments provide a separate control environment, or control plane, that can be used to monitor and/or control aspects of a data environment, or data plane. The functionality of a control plane can be provided as a set of Web services, for example, enabling the control plane to act as a virtual database administrator (DBA). A user or customer can submit a request to the control plane through an externally-visible application programming interface (API), for example, which can be analyzed to determine actions to be performed in the data plane, such as actions that create, delete, modify, expand, or otherwise modify a data store or data storage instance. State information can be passed to a component of the data plane for each task necessary to perform the action, such that the control plane can manage the performance of the tasks without having direct access into the data stores or other such components of the data plane. Once provisioned, a user can native access to the data instance(s) in the data plane, and can simply point existing applications (such as MySQL applications) to the domain name system (DNS) name or other location information for the particular data instance. There is no restriction or modification of query models or other such functionality, as a user can continue to use applications built on MySQL, Oracle, or other such database technology.

Systems and methods in accordance with various embodiments take advantage of a monitoring component in the control plane to continually monitor performance aspects of the data environment, such as by monitoring host machines or data instances for a relational database or other such data storage system. The monitoring component can analyze information from the data environment and determine any data stores or data instances that potentially need recovery or a similar action. The control environment can generate and execute a workflow to perform the recovery action. In various embodiments the workflow is able to access snapshots of the data store or instance at some point in the past. Snapshots of a data store or data instance can be captured at any appropriate time, such as every fifteen minutes, and stored to persistent storage. The persistent storage can be in the control environment and/or the data environment in various embodiments. Log data can also be captured and stored to persistent storage. As part of the recovery workflow, a new data instance can be instantiated, and data from the snapshots can be used to populate the new data instance. Information from the log files can be applied to the new data instance to bring the data instance to a more recent state. If available, log data that was not persisted can also be applied to bring the data instance up to the most recent state of the source data instance. A data store or data instance alternatively can be restored to a previous point in time, instead of the most recent state, where the data for that point in time is available.

Systems and methods in accordance with various embodiments also can allow a customer to clone a data store or data instance using snapshot and/or log information. A customer can call into the control environment with an identifier of a source data store or data instance to be cloned. To generate a copy of a data instance, for example, a workflow is generated in the control environment that causes a new data instance to be instantiated in the data environment, and data can be pulled from the appropriate snapshots to populate the data instance. If available and useful for the request, the stored log data also can be applied to bring the new instance to a particular state that is more recent than the snapshot used to populate the data instance. Other log information also can be used if available. Such an approach does not require the original data instance to be taken down for a period of time, and does not require a tedious manual exporting and importing process.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide a relational database service ("RDS") that enables developers, customers, or other authorized users to easily and cost-effectively obtain and configure relational databases so that users can perform tasks such as storing, processing, and querying relational data sets in a cloud. While this example is discussed with respect to the Internet, Web services, and Internet-based technology, it should be understood that aspects of the various embodiments can be used with any appropriate services available or offered over a network in an electronic environment. Further, while the service is referred to herein as a "relational database service," it should be understood that such a service can be used with any appropriate type of data repository or data storage in an electronic environment. An RDS in this example includes at least one Web service that enables users or customers to easily manage relational data sets without worrying about the administrative complexities of deployment, upgrades, patch management, backups, replication, failover, capacity management, scaling, and other such aspects of data management. Developers are thus freed to develop sophisticated cloud applications without worrying about the complexities of managing the database infrastructure.

An RDS in one embodiment provides a separate "control plane" that includes components (e.g., hardware and software) useful for managing aspects of the data storage. In one embodiment, a set of data management application programming interfaces (APIs) or other such interfaces are provided that allow a user or customer to make calls into the RDS to perform certain tasks relating to the data storage. The user still can use the direct interfaces or APIs to communicate with the data repositories, however, and can use the RDS-specific APIs of the control plane only when necessary to manage the data storage or perform a similar task.

Figure 2:
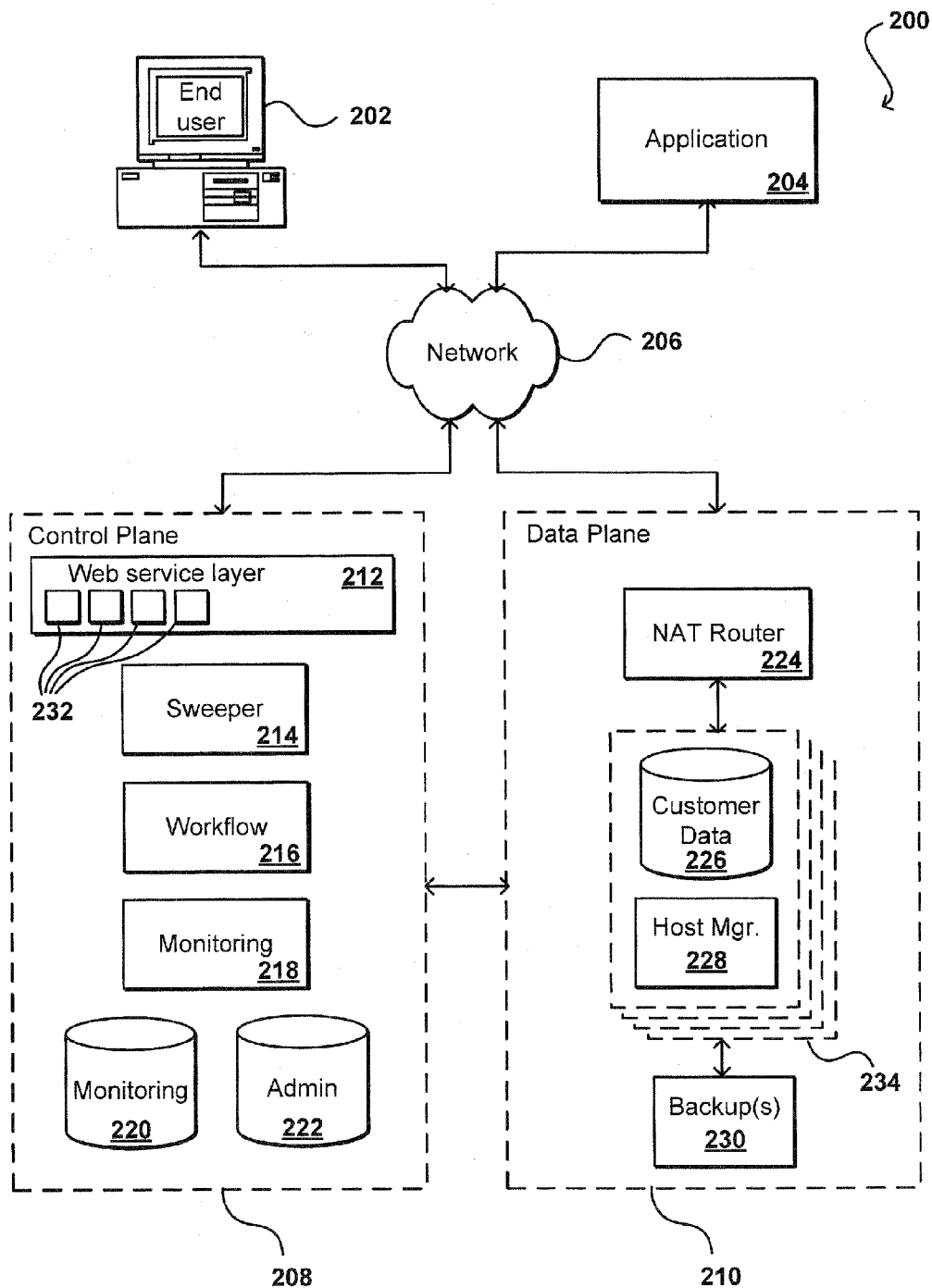
FIG. 2 illustrates an example separation of a control plane and a data plane that can be used in accordance with various embodiments.

FIG. 2 illustrates an example of an RDS implementation 200 that can be used in accordance with one embodiment. In this example, a computing device 202 for an end user is shown to be able to make calls through a network 206 into a control plane 208 to perform a task such as to provision a data repository of the data plane 210. The user or an application 204 can access the provisioned repository directly through an interface of a data plane 210. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 208 in this example is essentially a virtual layer of hardware and software components that handles control and management actions, such as provisioning, scaling, replication, etc. The control plane in this embodiment includes a Web services layer 212, or tier, which can include at least one Web server, for example, along with computer-executable software, application servers, or other such components. The Web services layer also can include a set of APIs 232 (or other such interfaces) for receiving Web services calls or requests from across the network 206, which the Web services layer can parse or otherwise analyze to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 222, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the customer APIs. The Web service layer can be responsible for Web service front end features such as authenticating customers based on credentials, authorizing the customer, throttling customer requests to the API servers, and marshalling or unmarshalling requests and responses. The API layer also can be responsible for reading and writing database configuration data to/from the administration data store, in response to the API calls. In many embodiments, the Web services layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "sweeper" component 214. A sweeper component can be any appropriate component operable to poll various components of the control plane or otherwise determine any tasks to be executed in response to an outstanding request. In this example, the Web services layer might place instructions or information for the "create database" request in the admin data store 222, or a similar job queue, and the sweeper can periodically check the admin data store for outstanding jobs. Various other approaches can be used as would be apparent to one of ordinary skill in the art, such as the Web services layer sending a notification to a sweeper that a job exists. The sweeper component can pick up the "create database" request, and using information for the request can send a request, call, or other such command to a workflow component 216 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

In this example, a workflow can be instantiated using a workflow template for creating a database and applying information extracted from the original request. For example, if the request is for a MySQL® Relational Database Management System (RDBMS) instance, as opposed to an Oracle® RDBMS or other such instance, then a specific task will be added to the workflow that is directed toward MySQL instances. The workflow component also can select specific tasks related to the amount of storage requested, any specific hardware requirements, or other such tasks. These tasks can be added to the workflow in an order of execution useful for the overall job. While some tasks can be performed in parallel, other tasks rely on previous tasks to be completed first. The workflow component or service can include this information in the workflow, and the tasks can be executed and information passed as needed.

An example "create database" workflow for a customer might include tasks such as provisioning a data store instance, allocating a volume of off-instance persistent storage, attaching the persistent storage volume to the data store instance, then allocating and attaching a DNS (domain name service) address or other address, port, interface, or identifier which the customer can use to access or otherwise connect to the data instance. In this example, a user is provided with the DNS address and port to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 210, and provide the DNS address to be used to access the instance. A user then can access the data store instance directly using the DNS address and port, without having to access or go through the control plane 208. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a repository, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service, which can then provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control plane 208 in this embodiment also includes at least one monitoring component 218. When a data instance is created in the data plane, information for the instance can be written to a data store in the control plane, such as a monitoring data store 220. It should be understood that the monitoring data store can be a separate data store, or can be a portion of another data store such as a distinct set of tables in an Admin data store 222, or other appropriate repository. A monitoring component can access the information in the monitoring data store to determine active instances 234 in the data plane 210. A monitoring component also can perform other tasks, such as collecting log and/or event information from multiple components of the control plane and/or data plane, such as the Web service layer, workflow component, sweeper component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each instance 234 in the data plane can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager also perform and/or mange the installation of software patches and upgrades for the data store and/or operating system. A host manger also can collect relevant metrics, such as may relate to CPU, memory, and I/O usage.

The monitoring component can communicate periodically with each host manager 228 for monitored instances 234, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 222 or another such job queue to perform an action for the instance, such as to verify the problem and re-provision the instance if necessary. The sweeper can access this information and kick off a recovery workflow for the instance to attempt to automatically recover from the failure. The host manager 228 can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 210 through the network using a Java Database Connectivity (JDBC) or other such client to directly interact with that instance 234. In one embodiment, the data plane takes the form of (or at least includes or is part of) a computing cloud environment, or a set of Web services and resources, that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 202 or application 204, for example, can be directed to a network address translation (NAT) router 224, or other appropriate component, which can direct the request to the actual instance 234 or host corresponding to the DNS of the request. As discussed, such an approach allows for instances to be dynamically moved, updated, replicated, etc., without requiring the user or application to change the DNS or other address used to access the instance. As discussed, each instance 234 can include a host manager 228 and a data store 226, and can have at least one backup instance or copy in persistent storage 230. Using such an approach, once the instance has been configured through the control plane, a user, application, service, or component can interact with the instance directly through requests to the data plane, without having to access the control plane 232. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 208 can be offered as at least one service by a provider that may or may not be related to a provider of the data plane 210, but may simply be a third-party service that can be used to provision and manage data instances in the data plane, and can also monitor and ensure availability of those instances in a separate data plane 210.

Figure 3:
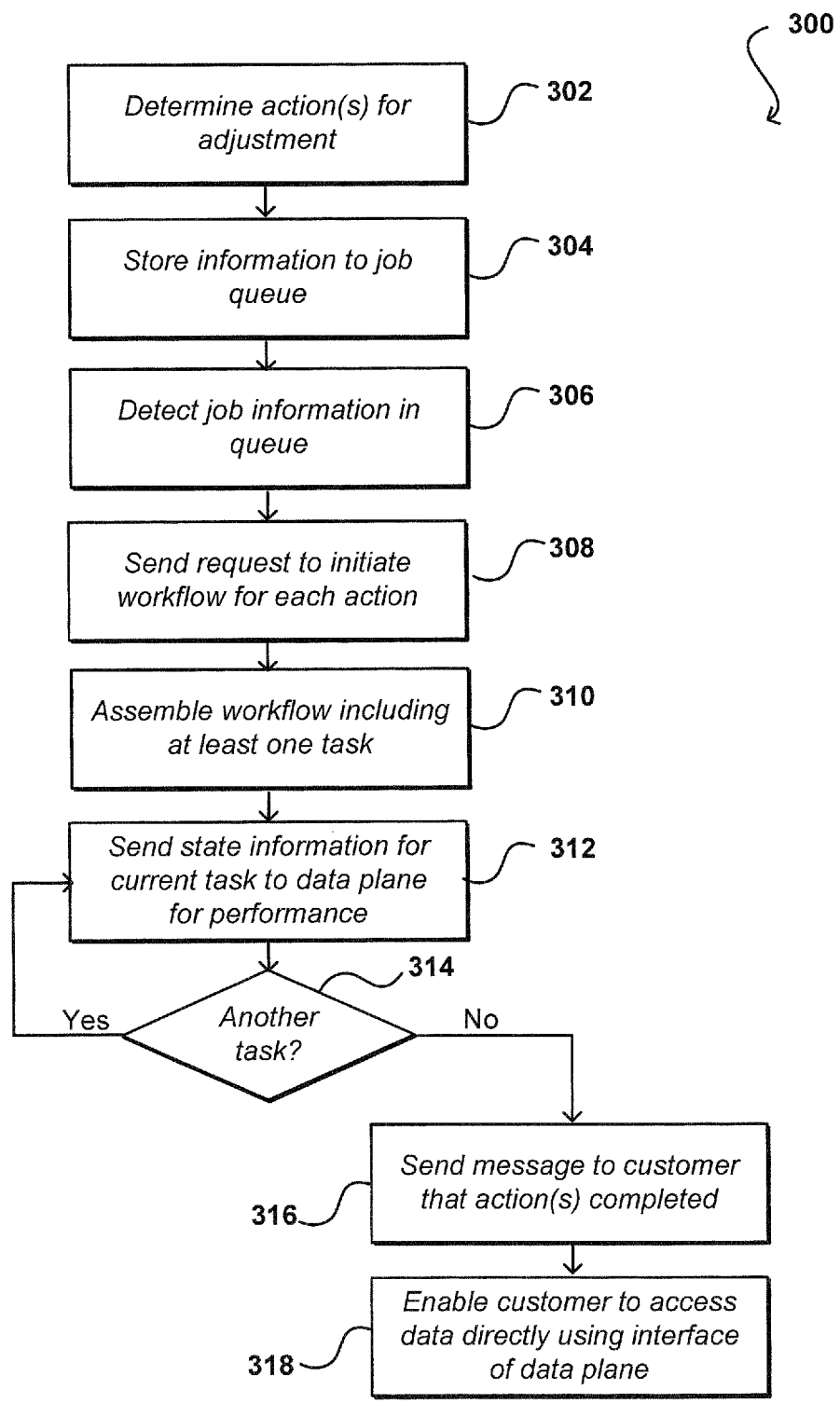
FIG. 3 illustrates an example process for performing an action in accordance with one embodiment.

FIG. 3 illustrates an example process 300 for performing an action and notifying the customer, in accordance with one embodiment. Using components and/or processes such as those discussed above, a determined action with respect to the data environment is authorized to be performed 302. As discussed, this can take the form of the monitoring component automatically requesting an action to be performed or a customer authorizing the performance of an action, while in other embodiments a customer could instead submit a request via an externally-facing API of the Web services layer, which can parse the request to determine the action(s) being requested. In this embodiment, information for the action, such as the type of action and parameters to be used to perform the action, is written to a job queue 304, such as may be located in an Admin data store or other such storage location. The job queue can be monitored, such as by a sweeper component, to determine the presence of job information 306 and, when job information is detected, a request can be sent to initiate a workflow for the requested action 308. This can include a request sent by the sweeper component to a workflow component and/or service to instantiate a workflow. In other embodiments, a workflow component might monitor the job queue for jobs, or a component of the Web services layer may send the job information directly to a workflow component.

Upon receiving the job information, the information is analyzed to determine and/or assemble an appropriate workflow for the requested action 310. As discussed, different tasks can be selected for the workflow based upon factors such as the type of action requested and the type of database engine being used. Beginning with the first task of the workflow, state information is sent to a host manager in the data environment operable to use the state information to determine a task to be performed, perform the task with respect to a data repository and/or data instance, and return a response upon completion of the task 312. Upon receiving the response, the workflow component determines whether there is another task to be performed 314. If so, state information for the next task is sent to the host manager, and upon completion of that task the host manager sends a response to the workflow component. After the final task has been completed, a message is sent to the requesting customer (or another appropriate user, application, or location) that the requested action has been completed 316. After the action has been performed, the customer is able to directly access the data instance upon which the action was performed using a data interface of the data environment, without accessing or passing through the control plane 318. As mentioned, the user can provided with a DNS name and port number, for example, such that if the action resulted in movement of data or another similar action, the customer or an application can continue to use the same DNS name, which will be directed to the appropriate location in the data plane.

As discussed, one advantage to use of a control plane is that the control plane can function as a virtual database administrator (DBA) and avoid the need for a human DBA to perform tasks such as monitoring performance data and performing trending or other such analysis. A control plane can also perform functions such as automatically performing scaling, recovery, or other such actions in the event of an actual or predicted need for action. Conventional approaches relying on a DBA to perform actions such as monitoring, analysis, cloning, and recovery are expensive and time-consuming, and can result in significant unavailability of customer data during the recovery and/or cloning processes.

Figure 4:
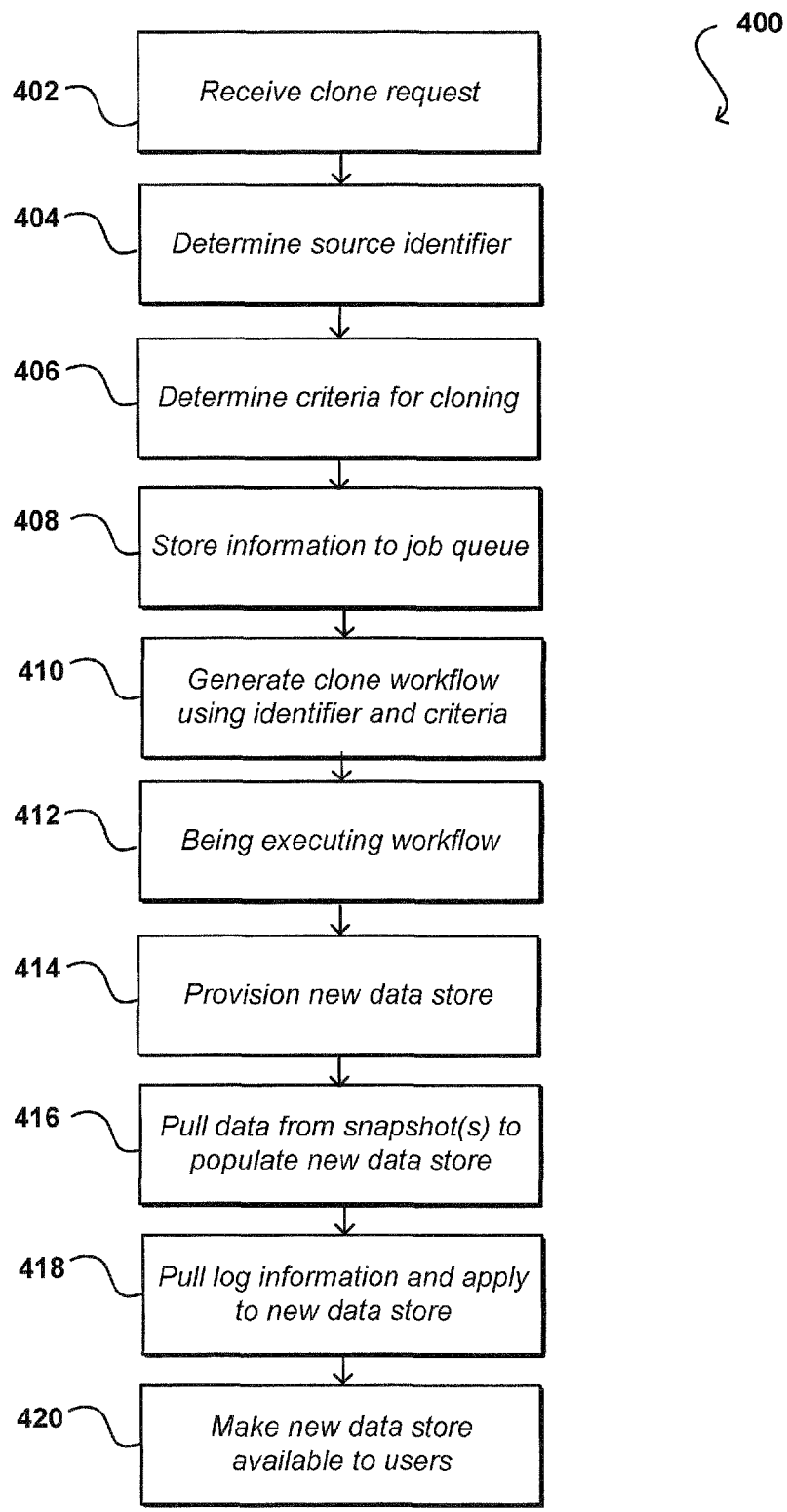
FIG. 4 illustrates an example process for cloning data volumes that can be used in accordance with one embodiment.

As discussed above, a control plane can be used to perform tasks such as cloning a data store or recovering a data store to a specified point in time. FIG. 4 illustrates an example of a process 400 that can be used to clone a data store in accordance with one embodiment. In this example, a request is received to clone a data store 402. This request can be received from a customer or application, such as by receiving a Web services call through an externally-facing API of the Web services layer, or can be generated by a monitoring component or other component of the control plane. A data source identifier can be determined from the request 404. The data source identifier can be any appropriate alphanumeric or other identifier used to uniquely identify a data store, data instance, or other data storage mechanism to serve as a source for generating a new data store. Any criteria for the cloned data store also can be extracted from the request 406, or from another appropriate source such as user preference or configuration information. The data source identifier can point to a data source having a database engine, query language, hardware class, storage requirements, availability zone, or any of a number of other such aspects that are different from the criteria specified for the cloned data store.

Information for the cloning request can be written to a job queue 408. As discussed above, this can involve components of the Web service layer parsing the request, analyzing the parsed information, and writing information for the determined cloning action to an Admin data store. A component, such as a sweeper component, can pull the information from the job queue and pass the information to a workflow component, which can generate a "clone data store" or similar workflow 410. The workflow can include any appropriate tasks for performing the cloning, such as may be specific to the criteria specified for the cloning and/or the determined aspects of the data source. For example, if the source is a MySQL data store but the clone is to be generated using Oracle RDBMS, then at least one specific task can be selected for the workflow that handles at least one of these database engines.

As discussed above, state information for each task of the workflow can be sent to a host manager in the data environment 412. As part of one task, a new data store is provisioned using the criteria specified by the request 414. As part of another task, a determination is made as to the logical volume group that corresponds to the data source, and each data volume that is a member of that group. For each data volume, which may correspond to a separate physical or logical device, a snapshot can be stored to a persistent data storage an any particular time, interval, etc. A "snapshot" as used herein refers to the state of the data volume at a particular point in time, where the snapshot can include information relating to the data, data structure, data schema, or any other appropriate aspect of the data volume. In some embodiments, snapshots are taken every fifteen minutes, although any other appropriate timing or interval can be used as appropriate. A DBA or other operator can configure the timing for snapshots in accordance with various embodiments.

As part of one of the tasks, a host manager can pull information from each identified relevant snapshot and store the information into the new data store. In some embodiments, the new data store will be created with the appropriate storage capacity, and data from the snapshots will be written to, and potentially apportioned across, the new data store 416, independent of the volume distribution of the source data store. In other embodiments, the new data store can use the same number of data volumes of the same size, such that each individual data volume can be cloned using the corresponding snapshot.

As should be apparent, copying data from the latest set of snapshots to the new data store will generally cause the state of the new data store to represent the time at which the snapshots were taken. If a user wants the data store cloned as of the time of the request, or another specified time more recent than the snapshot(s), another task of the workflow can cause log information for each data volume (or the logical volume group) to be accessed 418, and the updates in the log executed against the new data store in order to cause the data store to be current as of a specific time. In some cases, the updating can be done iteratively in order to bring the data store as close as possible to the current state of the data store. If the user wants the clone to be an exact replica of the current data store, then the customer can request that no updates be made to the source data store between the time of the request and the creation of the new data store, such that applying the log data to the snapshot data will result in what should be a completely replicated state of the data store. Once the source data is able to be updated, however, the source and cloned data stores will not be guaranteed to be in sync unless another mechanism is used to cause each update of the source data store to also be executed against the cloned data store. The new data store can be assigned a new data store identifier (and possibly other information such as a DNS name and port number) that allows the customer or other such user to access the new data instance 420.

Such an approach is advantageous for at least the reason that the cloning procedure does not result in an outage or otherwise significantly affect the availability of the source data store. Conventional cloning approaches require manual execution and can be very difficult to accomplish. For example, there is generally no native call to clone a data store, such that the data has to be exported using a complex export process. Further, a DBA or other operator typically has to configure the new data store, re-instantiate the entire data instance, and import back the data. Such an approach is complex and time-consuming, and provides a substantial opportunity for error that may not be detected until it is too late. An approach in accordance with various embodiments discussed herein, however, can allow a user to cause a data store to be cloned by submitting a single "clone data store" or similar request or call, whereby components of a control plane can cause a clone to be created that can have different aspects or criteria than the source data store. Further, such an approach does not result in any unavailability of the source data store.

A data store cloned as of a particular point in time can be advantageous in many situations. For example, a new instance of a data store can be generated for use in testing an application or service that allows actual data to be used without risk of losing or corrupting the source data. In other cases, a customer might want periodic snapshots of the data without affecting the availability of the data. For example, a customer might run quarterly reports, and might want a snapshot captured and stored at the end of each quarter such that information in the reports can be verified for compliance or other such reasons. A customer also might want to test a particular data storage configuration before making changes to the source data store. In such a case, the customer can clone the data store and adjust the configuration for purposes of running regression test cases or otherwise verifying the configuration. Such an approach also would allow a customer to modify a schema of a data store during a development phase, enabling the customer to apply and test the schema without having to risk losing data or having to undo the changes. The source data sets will not be disrupted.

Figure 5:
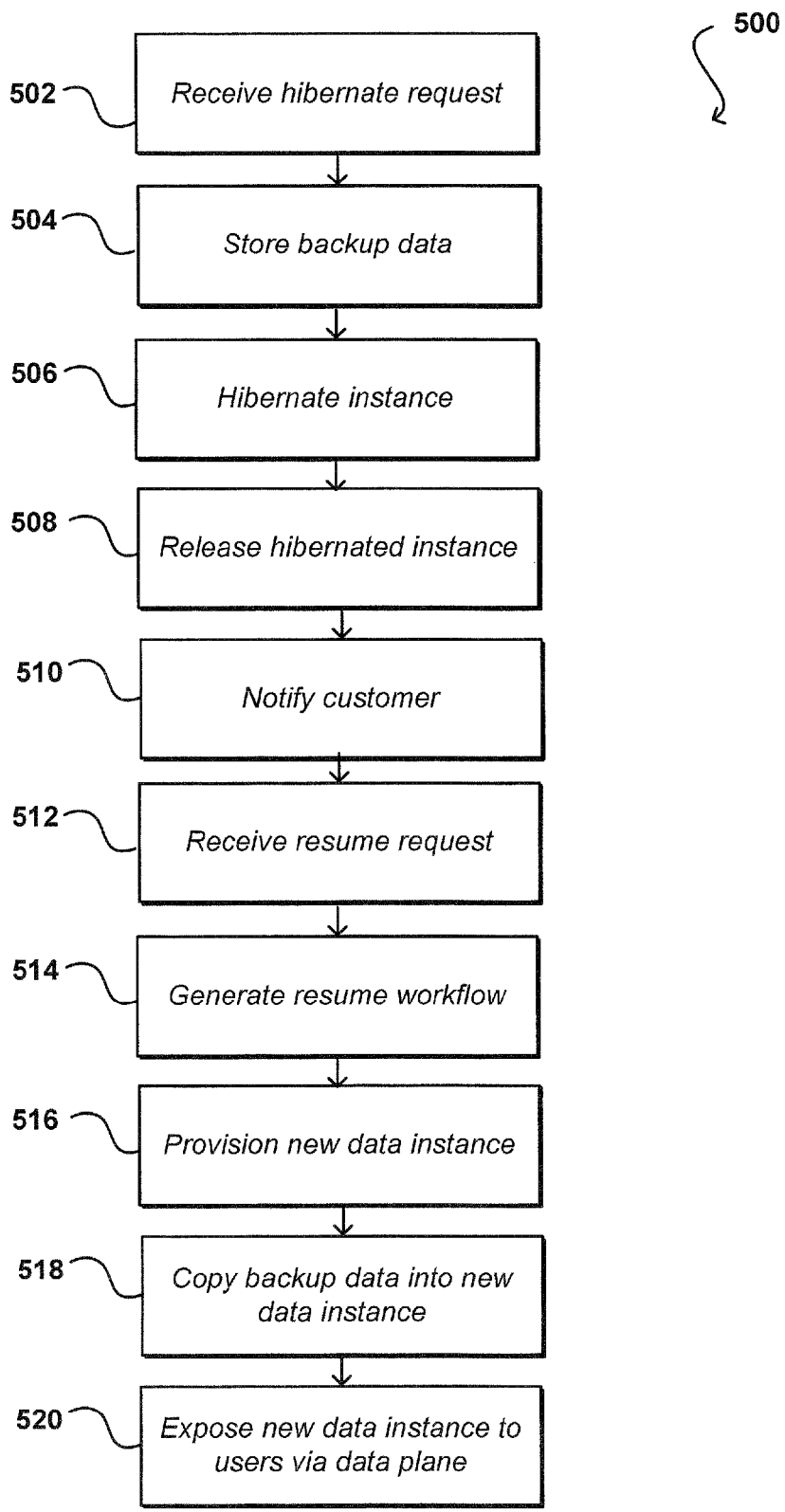
FIG. 5 illustrates an example process for hibernating data volumes that can be performed in accordance with one embodiment.

Cloning as of a particular point in time also can be beneficial for customers who will not be accessing a data store for an extended period of time. If, for example, a company does not access a particular data store on weekends, when development is not currently in process, or at other such times, the company might prefer not to incur costs for keeping the data store running while it is idle. FIG. 5 illustrates an example process 500 in accordance with one embodiment, wherein a request is received from a company to hibernate a data instance 502. This request might be received at the end of the day on Friday, or after the last access of the week, for example. A backup such as a snapshot is performed for the data instance 504, and stored for subsequent retrieval. The data instance is then hibernated 506, with the hibernated instance being released from the active cloud 508 such that all the company has to pay for is the storage of the snapshot data. The company then may not be charged for power, processing capacity, memory capacity, allocated bandwidth, or any other such fee that might be incurred if the data store is active and available over that period. Such an approach can be cost-effective, as the customer only is charged for an active data store during those periods when the customer requires the data store to be active. The company can be notified as to the success of the hibernation 510.

When it is desirable for a hibernated data instance to again be active and available, a "resume" or similar request can be received from the company 512, wherein a "resume" or similar workflow can be kicked off in the control plane 514. In other embodiments, the resume workflow can be the result of a resume call generated from within the control plane. In some embodiments, a job can be stored to the job queue with a particular time for resuming, which will be picked up by the sweeper at or around the scheduled time. In other embodiments, information can be written to a data store that can be picked up by the monitoring component around the scheduled time and written to the job queue. Various other such approaches to scheduling the resume action can be used as should be apparent. As part of the tasks of the resume workflow, a new data instance can be provisioned in the data environment 516 and a resume task can be passed to the appropriate host manager with at least a snapshot identifier, wherein the host manger can obtain the snapshot data for the data instance and copy the data to the new data instance 518. An identifier for the new data instance can be tied to the DNS and port name, for example, to allow a user to directly access the data instance 520 via the data plane.

Another use for cloned data instances involves the repartitioning of a data store. When repartitioning, a clone of the data instance can be made for each partition. The data that is not needed for each individual partition can be selectively deleted. Such an approach can be a relatively easy and efficient way to ensure that the appropriate data is received for each partition, as it is not necessary to determine up front where to send each block of data but instead each partition can receive a full copy and then delete the data that does not belong to the partition. Such an approach can be more efficient, as the work can be distributed to the machines for each partition. Such an approach also can be relatively fast, as the information does not need to be extracted out of the data store, but can instead utilize snapshots or archived data volumes. Such an approach can be beneficial because, unlike normal import and export operations, it is not necessary to take the source data store offline or otherwise make the data store unavailable. At most, approaches in some embodiments temporarily shut down the individual volumes, but there is no significant downtime for the data store. Another advantage is that any amount of data can be copied over using the snapshots. Standard import and export routines only are practical for data stores up to a certain size.

Approaches in accordance with various embodiments also can provide an improved way to recover a data store or data instance. As discussed, snapshot data can be captured and persistently stored at appropriate intervals, such as every fifteen minutes. Log volumes also can be persistently stored at regular intervals, which can be the same as, or shorter than, the intervals for the snapshots. In the event of a failure of a data store, for example, the data store can be recovered to a particular time in the recent past using the snapshots and, where appropriate and available, the stored log data.

Figure 6:
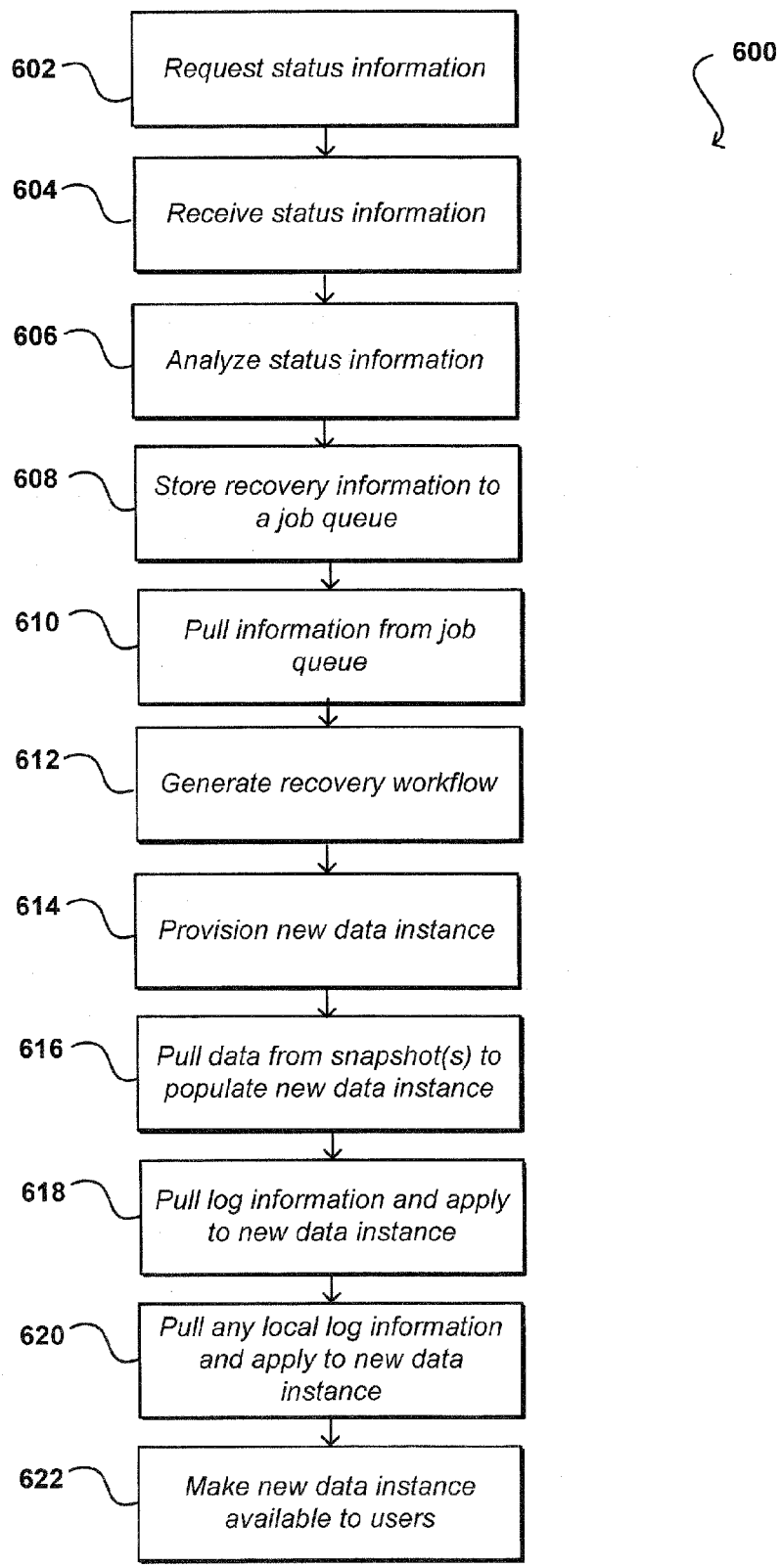
FIG. 6 illustrates an example process for automatically recovering data volumes that can be performed in accordance with one embodiment.

FIG. 6 illustrates an example of a process 600 for recovering a data instance in accordance with one embodiment. In this example, a monitoring component of the control plane calls into the host manager for a data instance to receive status and/or performance information 602. If the data instance is unavailable, corrupted, or otherwise in need of recovery, a message can be received from the host manager including information regarding such state of the data instance 604. Depending on the reason for the failure, a response might not be received from the host manager in cases where the host manager has crashed or otherwise experienced a failure causing the an issue with the data store. The monitoring component can analyze the response 606 and, upon determining that the data instance needs recovery, can store information for the recovery to the job queue 608. The information can include the appropriate identifier for the data instance, such that when the job information is picked up from the queue by a sweeper or similar component, the sweeper can pass the information to a workflow component 610 wherein the workflow component can kick off a workflow including the appropriate task information and make calls into the data plane for the various tasks using the data instance identifier 612.

In some instances, the monitoring component can receive information from the host manager as to the available snapshots and log files to be used for the recovery. If the monitoring component has information indicating that an error started occurring twenty-five minutes ago, which might have lead to the problem with the data instance, then the monitoring component (or other component of the control plane) can decide to restore to an earlier available time, such as an hour ago. Such an approach enables the data instance to be restored to a point which should not include any of the errors. The log information then can be examined and applied as desired, in order to ensure that the problems with the data instance do not recur. In other instances, the workflow can simply request to restore to the most recent snapshot and log information. If snapshot and log information are alternatively and/or additionally stored in the control environment, then the monitoring component can determine the available information for the data instance and select the copy or copies from which to pull information.

Based on the workflow, the monitoring component can pass information to at least one host manager of the control plane to provision a new data instance in the data environment 614 and a recovery task can request information from the snapshot for the data instance identifier be copied into the new data instance 616. As discussed, the snapshot data can come from the control and/or data environments depending upon the embodiment. After the data is copied into the data instance, state information for another recovery task can be passed to at least one host manager of the control plane to apply the information from a persistently stored log volume to the new data instance 618. In certain situations, the customer or operator might configure or decide to simply restore to the last snapshot, while in other situations where the error was not due to corrupt data but instead to a hardware or similar glitch, the customer might want the most recent state of the data instance any might apply as much log information as possible. If available, state information for another recovery task can be passed to at least one host manager of the control plane to apply the information from any cached or otherwise available log information to the new data instance 620. In cases where the log volumes are snapshotted or otherwise stored to persistent storage at intervals such as every five minutes, for example, there can be information in memory or another storage location that can be available that corresponds to the log information since the last log snapshot. This information then can be applied to the new data instance to bring the new data instance back to as recent a state as possible. Once all log information has been applied, the data instance can be made available to users 622. In some cases, a DNS name and port can be associated with the new data instance identifier such that customers calling into the data environment for the original data instance can instead have their calls routed to the new data instance.

For each of the tasks in such a workflow, at least one test for success or failure can be executed. For example, it can be desirable to ensure that a the snapshot data was stored into the new data instance properly before applying log information, as well as ensuring that log information was properly extracted before applying the information to the new data instance. If a test is run for a task, and it is determined that the task was not successful, the task can be retried at least one time (possibly up to a determined or selected number of times) before generating an error message or other such notification. The testing and retry can be performed automatically via the data environment, or as managed by the control environment. If a task fails a specified number of times, the entire process can be failed in order to avoid errors, data loss, or other such issues. Further, the control plane can manage the reversal of previous tasks, such as undoing of the application of a log volume to the data of a new data instance. Various other approaches can be used as well within the scope of the various embodiments.

Such an approach can provide for automatic, point-in-time recovery that does not rely upon backup tapes or other such manual processes. Such a process also can be relatively fast, as the recovery operation can begin as soon as the problem is discovered, and does not rely upon a human to get to the location (which sometimes can take an hour or more), locate the appropriate tapes or other backups, and then perform each step of the recovery process. Even in situations where a customer does not want an automatic recovery to occur but instead wishes to authorize the recovery, the customer can be notified of the problem via the control plane, and can call into the control plane via a recovery or similar API, which can recover from the failure by creating a new data store or data instance based at least upon the source identifier for the data store or instance, and potentially upon a point-in-time specified by the customer.

As mentioned, the control plane layer can take advantage, or "sit on top," of various basic software frameworks for performing tasks such as: implementing workflows, establishing secure communication channels between the host managers of the data plane and the components of the control plane, installing software on the instances of the data plane, and performing various database backup and recovery procedures.

One such aspect that can rely upon an underlying framework relates to repository and data backup. It can be desirable for the control plane to backup customer repositories and instances for various reasons, such as user-initiated backups (which can be performed during the backup time windows) and system-initiated backups during database restore, etc. A single framework can be implemented to handle both instances. To backup a repository, a framework can handle backing up both the data files and any associated log files. While various steps and processes will be described, it should be understood that various steps and approaches can differ from various database engines, such as MySQL and others.

Figure 7:
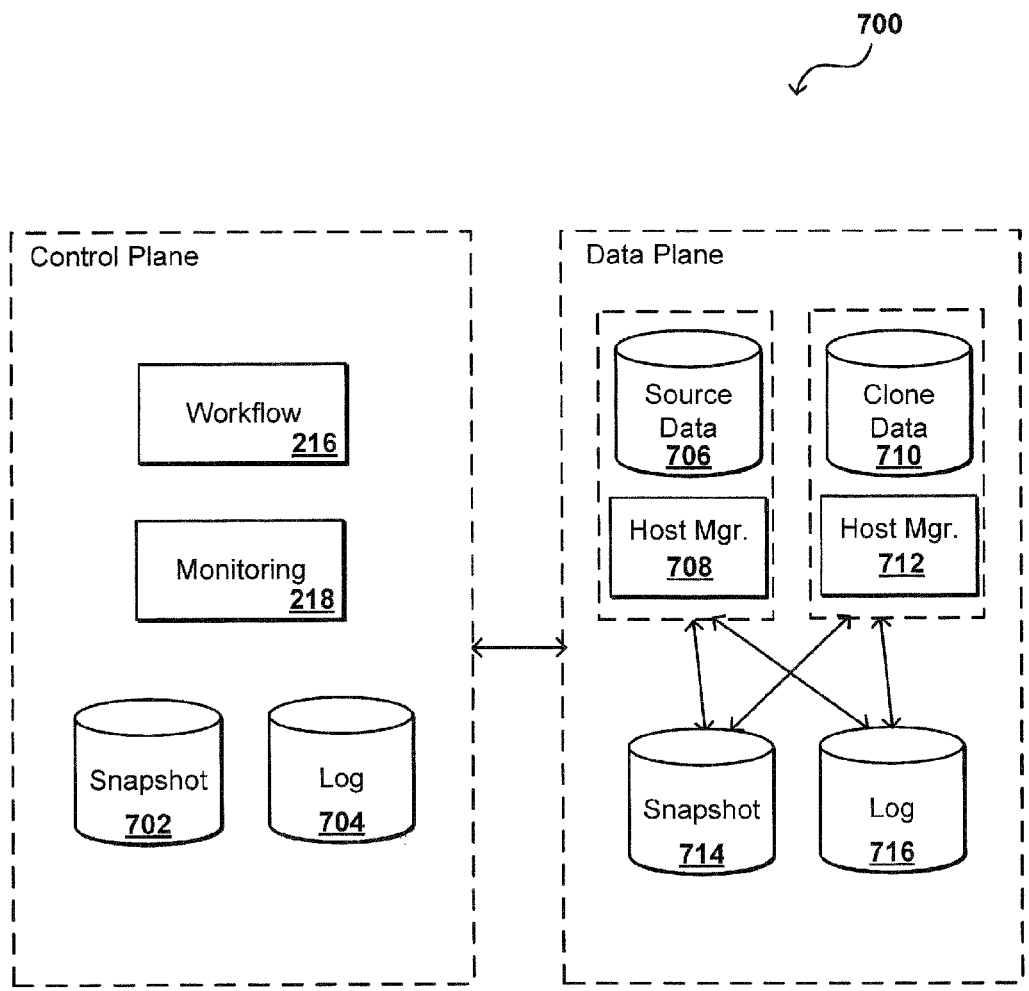
FIG. 7 illustrates an example configuration for storing snapshot and log data for data volumes in accordance with one embodiment.

An approach for backing up data in accordance with one embodiment uses two separate backup processes, a first procedure that backs up data at relatively short intervals in the data environment, and a second procedure that backs up data at relatively longer intervals in the control environment. FIG. 7 illustrates an example of a configuration 700 for performing such operations. As discussed above, snapshots can be stored for a source data store 706, or volume group, at intervals such as every fifteen minutes as may be controlled in the data environment using the respective host manager 708. These snapshots are stored to a snapshot data store 714 in the data environment without having to suspend operations of the source data store 706. Log data for the source data store also can be written to a log data store 716 of the data environment. As discussed, such storage can allow for point-in-time recovery, cloning, or other such operations.

As part of a second process, snapshot and log data also can be written to a snapshot data store 702 and a log data store 704 of the control environment. It should be understood that although these data stores are described as separate data stores, they can be part of the same data store, such as separate tables in the Admin or monitoring data stores discussed above. Such storage to the control environment can be desirable, as the data in the data environment can be restored to a particular point in time regardless of the availability of the data environment. Such storage may not be done as frequently as in the data environment, however, as the copying to the control plane can cause data environment operations to be suspended until shapshots are taken of the appropriate data volumes. The log files can similarly be copied over to the control environment. When it is desired to create a new data store 710, a new host manager 712 can be tasked with pulling and/or applying the appropriate information from the snapshot and log data stores. If a recovery action is performed using information from the control environment, then the data can be passed from the snapshot 702 and log data stores 704 to the new data store 710, while if the action is a cloning action from the data environment, the data can be passed from the local snapshot 714 and log data stores 716 to the new data store 710. The flow of data can be determined in some embodiments by the task of the particular workflow for the determined action. It should be understood, however, that in various embodiments all of the snapshot and log data can be stored to either the control environment or data environment, or even to a separate environment accessible by at least one of the control and data environments. For example, the snapshot and log data can be stored by the customer.

In some embodiments, components of an Admin tier of the control plane can wait for the backup window before initiating a backup procedure. Since a backup window might be specified for once a day in some embodiments, a snapshot can be captured to the control plane approximately once a day, which can make it advantageous in some instances to also store more frequent snapshots to the data environment. Once inside the backup window, the Admin tier can create a workflow that will create a workflow instance for repository backups. In one example, the workflow invokes a "supendDatabaseForBackup" or similar API for the host manager. This API can manage tasks to, for example, flush and lock the tables, suspend I/O to the data volume, create and mount an LVM snapshot for the log volume, create a log position file with the last log position, and start a timer to resume the database. This timer can be used to resume the repository in case the Admin tier hangs up while performing a task, such as taking snapshots, preventing the repository from being accidentally suspended for indefinite period of time. The workflow can poll the host manager for completion of these and/or other such tasks. Once the workflow has confirmed that the host manager has suspended the repository, the workflow can attempt to backup the data volumes using a set of ordered tasks. For example, the workflow can indicate to create snapshots of each data volume, and verify that the snapshots have been successfully created. A row can be inserted for each snapshot volume in a location such as a backup data volumes table. Subsequently, the workflow can invoke a host manager's "resumeDatabaseFromBackup" or similar API. This process can copy the repository logs and log position information to an appropriate storage location, can unmount the log snapshot, remove the log snapshot log volume, and unlock all tables. The Admin tier then can create a customer event that indicates the backup has been completed and the repository is again available.

As discussed, the log files also can be backed up in a similar fashion. The logs can be used to perform tasks such as replaying various transactions in case the data files have to be restored. The engine logs can be copied to an appropriate storage location, such that previously backed-up log files can be obtained using a simple list command. A host manager will use this result to determine whether there are logs that need to be copied. For example, the host manager can request a bucket list to obtain the list of log files written such that the last sequence can be backed up. If new logs have been created, it can first be determined that the logs are not actively being written to by a database engine, and then the logs can be copied and the copying verified to have been performed successfully.

Specific Interface Examples

As discussed above, users of the control plane can perform various tasks relating to data repositories and data instances using a set of APIs or other such interfaces. While the selection and names of the example APIs are used for purposes of explanation, it should be apparent that other selections, combinations, names, and other aspects can vary between the various embodiments. As discussed in one of the examples above, customers can create a data store using a "CreateDatabase" or similar API. The user can call a Web service to specify any desired values for an instance type (which describes the CPU and memory capacity), storage size, repository name, port, and other such values. The customer could also utilize a "DescribeDatabase" or similar API to poll on the status of the repository to determine the state of the repository, such as whether the repository state is provisioned. When the status of database is "AVAILABLE," for example, the customer can retrieve an endpoint which is returned as part of a response to the DescribeDatabase call.

Customers can delete a repository or instance using a "DeleteDatabase" or similar API. Customers also can have the ability to hibernate a repository or instance, placing an instance in a "sleep" state, for example, using a "HibernateDatabase" or similar API. During such a "sleep" state, the data typically will not be accessible but the data will be backed up durably. Customers can wake a hibernated data repository or instance using a "ResumeDatabase" or similar API.

As mentioned earlier, a control plane or service can handle the complexity of not just database provisioning, but also tasks such as upgrades, patch management, backups, and failover. A customer can control the times for backups and maintenance activities by enabling customers to specify (or modify) the backup window and maintenance window times while invoking a "CreateDatabase" (or "ModifyDatabase" or similar) API. Using a "ModifyDatabase" API, customers can increase the storage size, change the instance type, or modify various other fields.

At some point, the customer may wish to implement improved or updated processes for various development needs and may wish to set up a test instance of a particular data store. The customer may also want to take a snapshot of the production instance so that the test instance is fully populated and comparable with the production date. The customer decides that, for the particular needs of the testing procedure, the customer can utilize a SMALL instance for purposes of processing capacity, and can provision the same storage capacity as is used for production. The customer thus can submit a request to clone the database using a command line tool, such as by submitting:

create-database --identifier customertest --dbname tcustomer --size 150 --class small--engine mysq15.1--master master_username --password master_password-- port 4030

The customer can also check on the provisioning status by submitting a command such as:

describe-databases customertest

The requested modifications can take place during the maintenance window previously specified by the customer. While the changes are in progress, the status will show as "Pending Modification," for example, and can be changed to a state such as "Active" once the provisioning has been completed. The customer does not have to take any actions on the data plane side during the execution of this request. On the control plane side, the customer can subscribe to a service such as auto-scaling, as mentioned previously, such that once subscribed the customer does not have to take any action even on the control plan as the auto-scaling service will manage the scaling for the customer.

As discussed previously, the use of a control plane or service in accordance with various embodiments does not restrict the type of SQL queries that a customer can run, and does not impose any restrictions relating to construction of a schema, such as to be partition ready and not allow queries spanning partitions. Instead, a repository such as a relational database can be provisioned in a computing cloud without restricting the users' schema or queries. As commonly known, even though there is a theoretical SQL standard, the SQL quirks, syntaxes and their behaviors (e.g., NULL handling) vary across different relational database engines (e.g., MySQL, Oracle, or Postgres). For at least these reasons, users may wish to choose a relational database engine that is familiar for purposes of programming and operations. Such an approach allows customers to use the same set of database tools that the customers have used previously for tasks such as data modeling, development, and debugging, even when the customers migrate their data stores to the cloud (or elsewhere) via the control plane. Using such an approach, customers are not required to rewrite their application or any operational tools, which lowers the barrier of entry significantly for customers to move data to the cloud.

A customer's data repositories can be moved to the cloud in one embodiment by running the repositories on compute nodes of a cloud computing environment. Block level storage volumes, such as off-instance storage volumes that persist independently from the life of an instance, can be used with these instances for storing the repository binary, logs and volumes, for example. Such an approach can be advantageous, as the virtualization provides flexibility to quickly and easily scale a compute and storage resources for a repository. Further, such an approach can provide for persistent storage in the cloud.

As known in the art, relational databases can be run in different modes, such as may include: stand-alone (non-replicated), replicated, or replicated and partitioned. A customer typically makes the choice of which mode to run for a repository based on the availability and scalability needs of the repository and the incurred total cost of ownership (TCO). Some applications and services to not require a repository to be highly available and durable, and may instead utilize a stand-alone repository that is able to tolerate outages on the order of minutes. Other applications and servers can require a repository to be always available, and require the repository to never lose data even in the event of a failure. In this case, the applications and services typically require a replicated database offering. Some users, applications, or services require a massively scalable repository that can partition data across multiple repositories, such that scaling can occur beyond the compute and storage capacity of a single database. To address these different use cases, an approach in accordance with one embodiment offers at least two modes, such as stand-alone and high availability, for each database engine. Some embodiments also allow customers build their own partitioning layer on top of either stand-alone or high availability repositories.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for recovering from a failure of a database in a data environment, comprising:
   at least one processor; and
   memory including instructions that, when executed by the at least one processor, cause the at least one processor to:
   receive, to a control environment, information regarding a first database in a data environment, the control environment being separate from the data environment;
   when the information indicates that the first database requires recovery from a failure of the first database, determine a recovery workflow based at least in part upon the information and an approximate time when the first database failed;
   executing the recovery workflow, the recovery workflow comprising tasks to:
   determine an identifier of the first database;
   cause a second database to be provisioned in the data environment;
   cause data from a snapshot of the first database at the approximate time when the first database failed to be copied to the second database;
   cause the identifier of the first database to be associated with the second database; and
   cause the second database to be updated with log data associated with the first database and up to the approximate time when the first database failed.

2. The system of claim 1, wherein the recovery workflow is executed without user intervention.

3. The system of claim 1, wherein executing the recovery workflow is in response to a request by a user or an authorization by the user.

4. The system of claim 1, wherein the information regarding the first database is received from a host manager in the data environment operable to monitor the first database, and the instructions when executed by the at least one processor cause the at least one processor to:
   send a request for the information regarding the first database at determined intervals.

5. The system of claim 1, wherein the snapshot is one of a plurality of snapshots.

6. The system of claim 1, wherein the plurality of snapshots are stored in the at least one of the control environment or the data environment.

7. A non-transitory computer readable storage medium storing instructions for cloning a database in a data environment, the instructions when executed by at least one processor causing the at least one processor to:
   receive a request to clone a first database in a data environment, the control environment being separate from the data environment;
   determine a workflow for cloning the first database based at least in part upon the request, the request including a specified time; and
   execute the workflow for cloning, the workflow for cloning comprising tasks to:
   cause a second database to be provisioned in the data environment;
   cause data from a snapshot of the first database approximate to the specified time to be copied to the second database;
   provide an identifier of the second database; and
   cause the second database to be updated with log data associated with the first database and up to the specified time.

8. The non-transitory computer readable storage medium of claim 7, wherein the request is made by a user.

9. The non-transitory computer readable storage medium of claim 7, wherein criteria for each of the first database and the second database include at least one of a database engine, a query language, a hardware class, storage requirements, or an availability zone.

10. The non-transitory computer readable storage medium of claim 9, wherein the criteria of the second database are based at least in part upon at least one of the request, user preferences, or determined configuration information.

11. The non-transitory computer readable storage medium of claim 9, wherein at least one criterion of the first database is different from at least one corresponding criterion of the second database.

12. The non-transitory computer readable storage medium of claim 7, wherein the second database is provisioned using a same number of data volumes each of a same size as the first database.

13. The non-transitory computer readable storage medium of claim 7, wherein the workflow for cloning further comprises tasks to:
   cause a size of the data from the snapshot of the first database to be determined;
   cause an appropriate number of data volumes and an appropriate size for each of the data volumes to be determined based at least in part upon the size of the data from the snapshot,
   wherein the second database is provisioned using the appropriate number of data volumes and the appropriate size for each of the data volumes.

14. The non-transitory computer readable storage medium of claim 7, wherein the instructions when executed by the at least one processor further cause the at least one processor to:
   prohibit updates to the first database until executing the workflow for cloning is completed.

15. The non-transitory computer readable storage medium of claim 7, wherein the snapshot is one of a plurality of snapshots.

16. A system for hibernating a database in a data environment, comprising:
   at least one processor; and
   memory including instructions that, when executed by the at least one processor, cause the at least one processor to:
   receive, to a control environment, a request for hibernating a first database in a data environment, the control environment being separate from the data environment;
   determine a workflow for hibernating the first database; and
   execute the workflow for hibernating, the workflow for hibernating comprising tasks to:
      determine an identifier of the first database;
      cause the identifier of the first database to be stored;
      cause data of a snapshot of the first database at an approximate time when the request for hibernating the first database was received to be stored;
      cause remaining resources associated with the first database to be released;
      cause log data associated with the first database and up to the approximate time when the request for hibernating the first database was received to be stored.

17. The system of claim 16, wherein the instructions when executed by the at least one processor cause the at least one processor to:
   receive, to the control environment, a second request to resume the first database;
   determine a second workflow for resuming the first database; and
   execute the second workflow for resuming, the second workflow for resuming comprising tasks to:
      cause a second database to be provisioned in the data environment;
      cause the data of the snapshot of the first database at the approximate time when the request for hibernating the first database was received to be copied to the second database; and
      cause the identifier of the first database to be associated with the second database.

18. The system of claim 17, wherein the second request is made by a user.

19. The system of claim 17, wherein the second workflow for resuming further comprises a task to:
   cause the second database to be updated with the log data.

20. The system of claim 16, wherein the workflow for hibernating is executed based at least in part upon determined intervals.

21. The system of claim 20, wherein the workflow for resuming is executed based at least in part upon second determined intervals.

22. The system of claim 16, wherein the snapshot is one of a plurality of snapshots.

* * * * *